United States Patent [19]

Seidel et al.

[11] Patent Number: 5,527,231
[45] Date of Patent: Jun. 18, 1996

[54] METHOD FOR CONTROLLING A CONTINUOUSLY VARIABLE TRANSMISSION OF A MOTOR VEHICLE

[75] Inventors: Willi Seidel, Eberdingen-Hochdorf; Joseph Petersmann, Wimsheim, both of Germany

[73] Assignee: Dr. Ing. h.c.F. Porsche AG, Weissach, Germany

[21] Appl. No.: 170,182

[22] PCT Filed: May 21, 1992

[86] PCT No.: PCT/EP92/01137

§ 371 Date: Apr. 21, 1994

§ 102(e) Date: Apr. 21, 1994

[87] PCT Pub. No.: WO93/00229

PCT Pub. Date: Jan. 7, 1993

[30] Foreign Application Priority Data

Jun. 21, 1991 [DE] Germany .......................... 41 20 589.8

[51] Int. Cl.$^6$ .......................... F16H 61/00; B60K 41/26
[52] U.S. Cl. .................. 477/46; 477/47; 477/48
[58] Field of Search ................. 477/47, 48, 46; 364/424.1

[56] References Cited

U.S. PATENT DOCUMENTS

| | | | |
|---|---|---|---|
| 4,590,561 | 5/1986 | Abo et al. | 477/47 X |
| 4,679,145 | 7/1987 | Beeck et al. | 364/424.1 |
| 4,823,267 | 4/1989 | Kumura | 477/47 X |
| 5,166,877 | 11/1992 | Ishikawa et al. | 364/424.1 |
| 5,319,999 | 6/1994 | Morishige et al. | 477/46 |
| 5,390,117 | 2/1995 | Graf et al. | 364/424.1 |

FOREIGN PATENT DOCUMENTS

| | | |
|---|---|---|
| 0038083 | 10/1981 | European Pat. Off. . |
| 0347263 | 12/1989 | European Pat. Off. . |
| 0373865 | 6/1990 | European Pat. Off. . |
| 3341652 | 6/1985 | Germany . |
| 3731487 | 4/1988 | Germany . |
| 3939671 | 5/1990 | Germany . |
| 3922040 | 1/1991 | Germany . |
| 3922051 | 1/1991 | Germany . |
| 4029976 | 4/1991 | Germany . |
| WO93/00533 | 1/1993 | WIPO ........................ 477/46 |
| WO93/00532 | 1/1993 | WIPO ........................ 477/46 |

*Primary Examiner*—Khoi Q. Ta
*Attorney, Agent, or Firm*—Evenson, McKeown, Edwards & Lenahan

[57] ABSTRACT

A method for controlling a continuously variable transmission, preferably activated electro-hydraulically, of a motor vehicle equipped with an internal combustion engine, provides for an increase of the transmission ratio while braking and especially while approaching a curve. Adherence to certain boundary conditions for this guarantees a safe driving behavior. The braking effect of the internal combustion engine is used more effectively by increasing the transmission ratio, so that the service brake is relieved of stress. In connection with a transmission-ratio retention mechanism before, during, and after curves, the motor vehicle with a continuously variable transmission controlled by this method can be accelerated nearly without delay when it comes out of the curve.

24 Claims, 7 Drawing Sheets

METHOD FOR CONTROLLING A CONTINUOUSLY VARIABLE TRANSMISSION OF A MOTOR VEHICLE

BACKGROUND AND SUMMARY OF THE INVENTION

The invention relates to a method according for controlling a continuously variable transmission of a motor vehicle.

The usual automatic transmission controls with internal combustion engines generally respond to retraction of the gas pedal by reducing the transmission ratio. However, when driving on curves or when braking, this is not always desirable since such load changes can in some circumstances lead to unsafe driving conditions or, when the vehicle accelerates again by increased gas, the transmission ratio must be forcibly increased.

In this connection and in connection with automatically shifting multi-step transmissions, the German Patent document DE-33 41 652 C2 has disclosed that this reduction of the transmission ratio (upshiding) in curves can be avoided by sensing the transverse acceleration of the motor vehicle. However, this procedure can only avoid shifting in curves.

In order to be able specifically to prevent a reduction of the transmission ratio already when approaching a curve, the DE- 39 22 040 A1 corresponding to U.S. Pat. No. 5,025,689, discloses a method for controlling an automatically shifting transmission, according to which the rate of change of the gas pedal is sensed and, if this rate falls below the specified (negative) limit, a signal is generated to prevent upshifting, inasmuch as push-type operation is detected. Upshifting is then prevented, until pull-type operation resumes and a fixed amount of time has passed.

The German Patent document DE- 39 22 051 A1 corresonding to U.S. Pat. No. 5,157,609, additionally provides that this period of time be made dependent on another parameter (driving activity), from a combination of several operating or driving parameters, and which evaluates the driving style of a driver or the currently prevailing traffic situation.

Starting from this prior art, it is an object of the invention to create a method for controlling a continuously variable motor-vehicle transmission, preferably electro-hydraulically operated, which is further improved in particular as regards its behavior in adjusting its transmission ratio or the engine rpm during braking.

According to the invention, this object is achieved by a method for controlling a continuously variable transmission (2), which is activated electro-hydraulically, of a motor vehicle driven with an internal combustion engine (4), which can be controlled by a power-control element, including one of a gas pedal and a throttle valve, such that the transmission ration (ue) of the transmission (2) is automatically adjusted through the intermediacy of at least one characteristic control curve ($RKL_j$) in dependence on the position of the power control element (alpha (t)) and the engine rpm (nmot (t)), the method comprising the step of:

controlling the continuously variable transmission by increasing the transmission ratio (ue) at a fifth specific, finite, and slow rate (fifth time derivative of the transmission ratio cg5=due/dt=f(SK(t)), if a) at least one of 1) a service brake of the motor vehicle is activated (brake signal b=1 and 2) the time derivative of the driving speed (dv(t)/dr) is less than a first negative longitudinal-acceleration limit value (albg (ue, nmot, t), albg(ue, nmot, t)<0 (dv(t)/dt<albg(ue, nmot, t)); and b) a transverse acceleration (aq(t)), sensed by means of a transverse-acceleration sensor (16), falls below a first specific transverse-acceleration limit curve (aqgl(v(t))) (aq(t)<aqgl(v(t))); and c) the time derivative of the driving speed (dv(t)/dt) is greater than a second negative longitudinal-acceleration limit value (albbg(nmot, ue, SK(t), t)=k(ue, SK(t)) * albg(ue, nmot, t)<0, (dv(t)/dr>dt albbg(nmott, ue, SK(t)=k(ue, SK(t)) * albg(ue, nmot, t)); and d) the driving speed (v(t)) is less than a driving-speed limit value (vg(ue, SK(t))), (v(t)<vg(ue, SK(t))).

The advantages of the invention primarily are to be regarded as the circumstance that a method has been created to control a continuously variable motor-vehicle transmission, preferably operated electro-hydraulically, in which the way the transmission ratio is adjusted during braking, especially before curves, has been further improved.

When certain non-critical conditions exist, the transmission ratio is here increased during braking, at a final third speed, such that here, too, the speed of adjustment is less than the maximum speed of adjustment.

Adherence to the conditions in this connection guarantees safe operation of the motor vehicle. In particular, the system monitors that the transverse acceleration is not too high, that the vehicle is not slowed down too much and that the driving speed is not too high, especially so as to avoid a loss of the longitudinal and lateral guiding forces of the wheels of the motor vehicle. When the transmission ratio is increased, the braking torque of the driving (internal combustion) engine can affect the drive wheels more strongly. However, now this cannot have a negative effect on the driving behavior of the motor vehicle.

An increase of the transmission ratio during braking preferably is initiated when a state of a transmission-ratio retention mechanism is active. The latter is activated in well-known fashion when the motor vehicle approaches a curve and the driver no longer presses on the gas pedal.

Increasing the transmission ratio during braking, on the one hand, increases the braking effect of the motor vehicle engine in push-type operation, so that the brake (service brake) of the motor vehicle is relieved of stress. On the other hand, in connection with retaining the transmission ratio before, during and after curves, the optimum transmission and engine rpm is always made available to the driver for accelerating the motor vehicle again after passing a curve.

The invention is explained below in terms of the embodiments shown in the drawings.

DETAILED DESCRIPTION OF THE DRAWINGS

Figure 1:
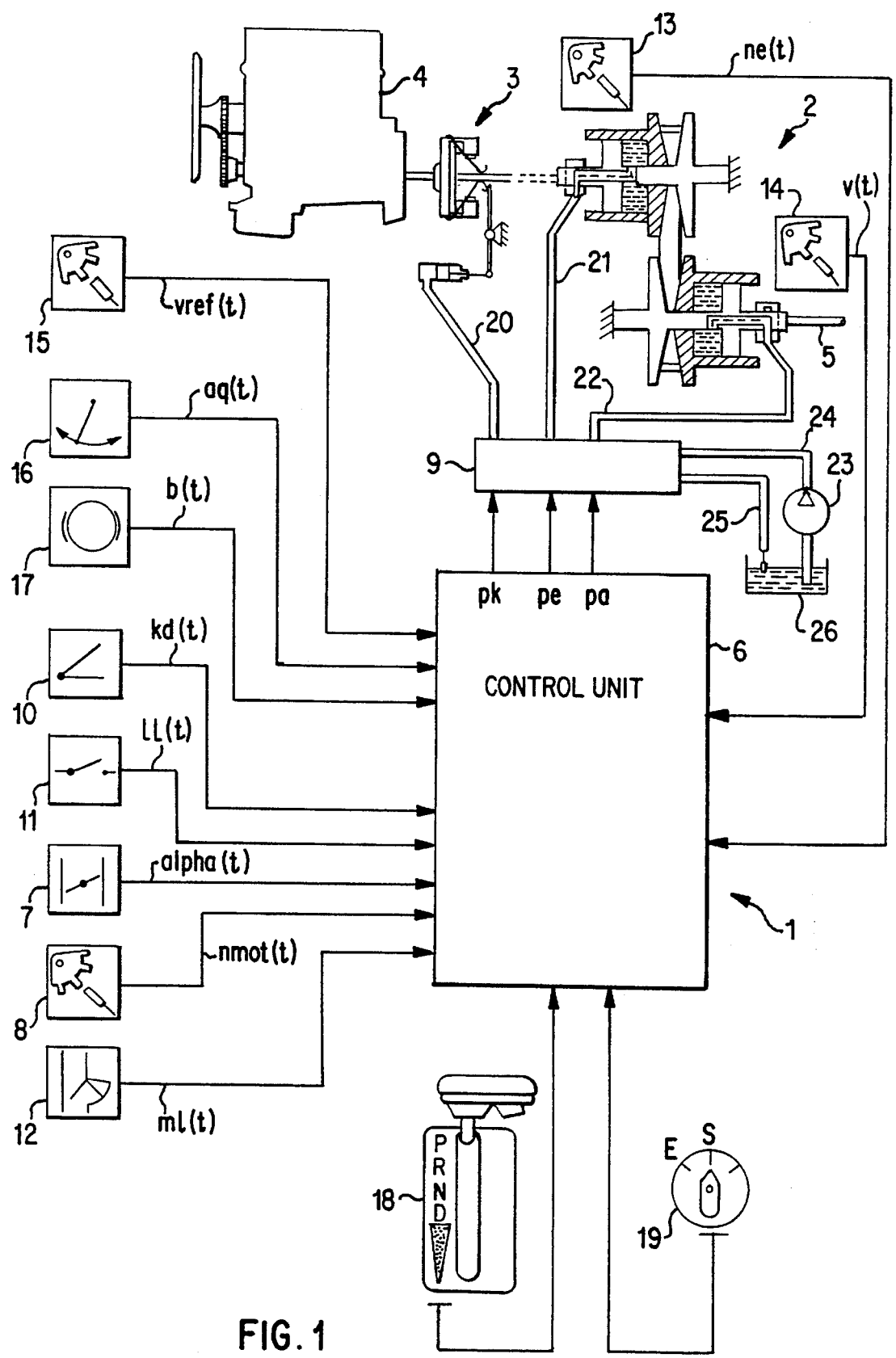
FIG. 1 shows a block circuit diagram of an electro-hydraulic control for a continuously variable transmission of a motor vehicle.

In FIG. 1, 1 designates a control of an electro-hydraulically activated, continuously variable transmission 2, using a belt-drive transmission as an example. The continuously variable transmission 2 is driven by an internal combustion engine 4 via a controllable starting clutch 3. A drive shaft 5 of the continuously variable transmission 2 is connected to a (not shown) wheel drive of a motor vehicle.

Signals or quantities, which change with the time t, are subsequently shown as functions of time f(t).

A control unit 6 actuates a hydraulic valve block 9 at least—without restricting generality—as a function of the throttle valve position alpha(t) of a throttle valve angle transmitter 7 and as a function of an engine rpm nmot(t) of an engine rpm transmitter 8 of the internal combustion engine 4. Instead of the position of the throttle valve, the position of any element, which affects the drive power of the motor vehicle engine, e.g. of a gas pedal or of an injection pump lever of a spontaneously igniting diesel engine, or the output signal of an electric or electronic gas pedal naturally can also be sensed and processed.

To control the continuously variable transmission 2 and the starting clutch 3, the control unit 6 receives further input variables or measurement variables: a kick-down signal kd(t) from a kick-down switch 10, an idling signal ll(t) from an idling switch 11, the air quantity or air mass ml(t) of an air quantity or air mass transmitter 12, and the transmission input rpm ne(t) of a transmission input rpm transmitter 13, and a driving speed v(t) of a driving speed transmitter 14 of the motor vehicle. In addition, a speed vref(t) from a reference speed transmitter 15 at a (not shown) vehicle axle, a transverse acceleration aq(t) from a transverse acceleration transmitter 16, and a braking signal b(t) from a braking signal transmitter 17 are sensed and are processed by the control unit 6.

Finally, the driver can set the control, in usual fashion, through a selection lever 18 to choose the driving positions: P (park), R (reverse), N (neutral), and D (automatic adjustment of the transmission ratio of the continuously variable transmission); furthermore, a range of settings of the selection lever 18 is provided so as to prescribe the transmission ratio directly.

Finally, with the usual transmission controls, the characteristic control curve, according to which the control unit 1 controls a continuously variable transmission in drive position D, is selected through a program selection switch 19. As a rule, two characteristic control curves can be selected here, such that a consumption-optimized characteristic control curve RKL1 is manually set in position E, and a performance-optimized characteristic control curve RKL5 is manually set in position S.

As an alternative to the program selection switch 19, a control method can also be implemented in the control unit 6 which, for example, according to the DE 33 41 652 C2 or the DE 39 22 051 A1, evaluates the driving style of a driver or his activity in response to the traffic situation, with reference to the control of the motor vehicle, and which derives a driving activity SK(t) (gas-pedal activity) from one or more operating and/or driving parameters. On the basis of this driving activity SK(t), and in accordance with a switching position of the program selection switch 19, one of several characteristic control curves RKLj-f(SK(t)); (j=1, 2, . . . , 5) can be drawn upon to control the continuously variable transmission and/or the starting clutch 3.

As a function of the above variables, the control unit 6 controls the hydraulic pressure in the starting clutch 3, through a signal output pk and through the valve block 9, as well as the transmission ratio ue between the transmission input rpm ne(t) and the transmission output rpm (driving speed) v(t), through the signal outputs pe and pa and through the hydraulic valve block 9. The transmission ratio ue(t) here is proportional to the quotient of the transmission input rpm ne(t) to the driving speed v(t): ue(t)=prop*(ne(t)/v(t)); here, prop is a proportionality factor. A numerical increase/decrease of the transmission ratio ue(t) here means a transmission into short/long.

For this purpose, the hydraulic valve block 9 connects the corresponding control lines 20, 21, and 22 of the starting clutch 3 and of the continuously variable transmission 2 to a pressure line 24, which in turn is connected to a pump 23, or to a return line 25, which in turn is connected to a supply container 26 for hydraulic fluid.

Figure 2:
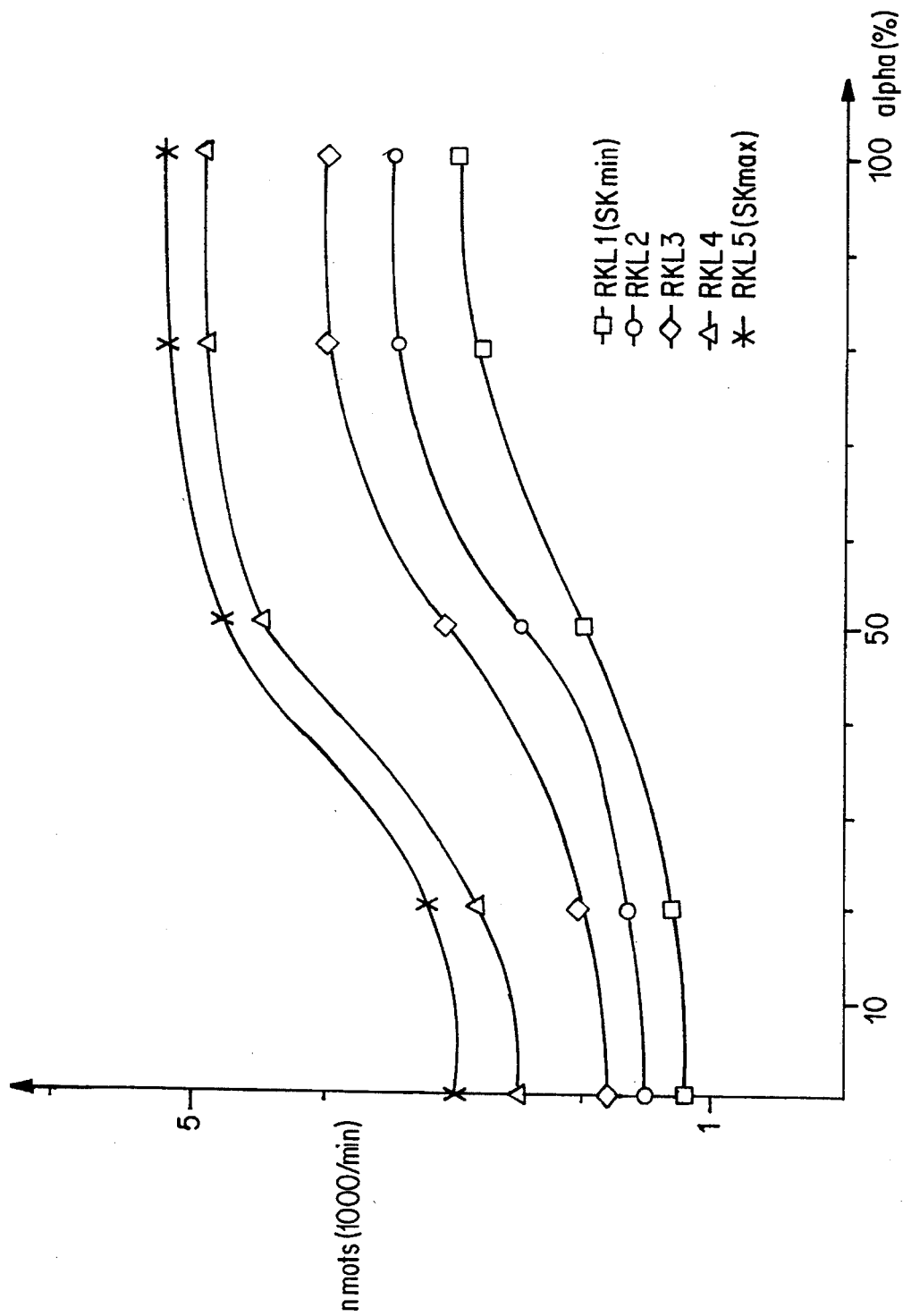
FIG. 2 shows a family of several control curves, which associate specific theoretical engine rpm values with values of the throttle valve position.

To control the continuously variable transmission 2, the transmission ratio ue is automatically adjusted through the intermediacy of the control unit 6 and the valve block 9, and through the characteristic control curves RKLj, at least as a function of the throttle valve position alpha(t) and the engine rpm n(t); the characteristic control valve RKLj is here selected from a family of several characteristic curves RKLj (j=1, 2, . . . , 5) in accordance with FIG. 2, in correspondence with the switch position of the program selection switch 19 or in correspondence with the driving activity SK(t), which evaluates the driving style of the driver or his action in response to the traffic situation as this affects the control of the motor vehicle.

Without restricting generality, other variables can also be drawn upon to control the transmission, and the characteristic control curves can be expanded to families of such curves or to characteristic diagrams.

The characteristic control curves shown in FIG. 2 here cover at least in steps the range between a characteristic control curve RKL1, which makes possible consumption-optimized operation of the vehicle (position "E" of the program selection switch), and a characteristic control curve RKL5, by means of which the operation of the vehicle is performance-optimized (position "S" of the program selection switch 19).

Inasmuch as the control selects the characteristic control curves RKLj in correspondence with the driving activity SK(t), the control of the continuously variable transmission 2 automatically adjusts itself to the driving style of the driver, so that no manual intervention or change of characteristic control curves is necessary.

The transmission ratio of the continuously variable transmission 2 is adjusted by the control unit 6 preferably in such a way that the engine rpm nmot(t) follows a design value of the engine rpm as optimally as possible. For this purpose, an underlying tachometer can be implemented in the control unit 6. The transmission ratio ue thus is a function of the theoretical engine rpm nmots, the actual engine rpm nmot, and the time t: ue=f(nmots, nmot, t). A deviation Dnmot(t)= nmots(t)—nmot(t) of the engine rpm nmot(t) from the theoretical engine rpm and nmots(t) thus tends to 0.

The instantaneous value of the theoretical engine rpm nmots is here determined in terms of the instantaneously chosen characteristic control curve RKLj according to FIG. 2 from the instantaneous value of the throttle valve position alpha(t) and the driving activity SK(t): nmots—RKLj(alpha, SK).

As FIG. 2 shows, the characteristic control curves RKLj are essentially progressive in the range of lower values of the throttle valve position alpha, but become regressive in a middle range of the throttle valve position alpha. The throttle valve position alpha, in percent, is plotted on the horizontal axis. The value 0% corresponds to a closed throttle valve, and the value 100% corresponds to a fully open throttle valve.

Five characteristic control curves RKL1, RKL2, RKL3, RKL4, and RKL5 are plotted. Here, the characteristic control curve RKL1 makes possible consumptionoptimized operation of the motor vehicle, and SK(t)=SKmin is chosen for a minimal driving activity. The characteristic control curve RKL5 is chosen for a maximum driving activity SK(t)=SKmax, such that performance-optimized operation of the motor vehicle is possible.

In accordance with the DE 33 41 652 C2 or the DE 39 22 051 A1, (or corresponding U.S. Pat. Nos. 4,679,145 or 5,025,689) the driving activity SK(t) is determined by a functional connection, which evaluates the driving style of the driver or his action in response to the traffic situation, from cyclically or anti-cyclically sensed current and past values of a single operating parameter or from a single variable composed of several operating parameters of a motor vehicle.

For example, values of the throttle valve position alpha(t), of the driving speed v(t), and of the transverse acceleration aq(t) are here sensed in the second or millisecond range, and from this further values are calculated, such as, e.g., the rate of change of the throttle valve dalpha(t)/dt and the acceleration of the vehicle dv(t)/dt. The sensed and calculated values are linked with other operating parameters through characteristic diagrams. Through a functional connection, they are assembled into an intermediate variable, from which a driving activity SK(t) is determined by forming sliding averages, which take into account both the newly calculated values and the past values over the long term.

Through another functional connection, a characteristic control curve RKLj is finally associated with this driving activity SK(t), e.g. in accordance with the procedure shown in the DE 39 22 051 A1 (or corresonding U.S. Pat. No. 5,157,609).

It is especially desirable to avoid a reduction of the transmission ratio, which usually occurs with transmissions of this type, for example, if the vehicle approaches a curve and the driver steps off the gas pedal.

As already indicated in the DE 39 22 040 A1 and the DE 39 22 051 A1, a curve can be recognized in this way by scanning the time change of the throttle valve position dalpha(t)/dt. In fact, a driver retracts the gas pedal—and thus generally also the throttle valve—faster before a curve than he would under normal circumstances, for example, to reduce his driving speed.

Conventional transmission controls reduce the transmission ratio ue when the gas pedal is retracted or not activated. This is prevented by a first variant of the inventive method, i.e. the instantaneous transmission is retained as long as the state of the transmission-ratio retention mechanism usf is active, usf=1.

As an alternative to this, according to a second variant of the inventive method, the transmission ratio (ue) is changed, at least as long as the state of the transmission-ratio retention mechanism usf is active (usf=1), at a first specific, finite, and relatively slow speed (first time derivative of the transmission ratio ck1=due/dt=f(SK(t))) until the transmission ratio ue reaches the value, which is needed to reach the theoretical engine rpm nmots(t) as provided for at the instantaneous operating point of the motor vehicle (alpha(t), v(t), nmot(t), t) in the instantaneously adjusted characteristic control curve RKLj.

As another alternative, according to a third variant of the control process, the transmission ratio ue is changed, at least as long as the state of a the transmission-ratio retention mechanism usf is active, in such a way that the engine rpm nmot remains constant, or that the engine rpm nmot(t) is reduced, at a second specific, finite, and relatively slow speed (second time derivative of the engine rpm nk2=dnmot/dt=f(SK(t))) until it reaches that value of the theoretical engine rpm nmots(t), which is provided for at the instantaneous operating point of the motor vehicle (alpha(t), v(t), nmot(t), t) in the instantaneously adjusted characteristic control curve RKLj.

With all three variants, the state of the transmission-ratio retention mechanism goes over into the active state usf=1, when a time derivative dalpha(t)/dt of the throttle valve position alpha(t) falls below a negative limit -alphag and when push-type operation is recognized; after expiration of a first time period TI(SK(t)), the state of the transmission-ratio retention mechanism usf goes over into the inactive state through usf=0, when pull-type operation is recognized.

The terms pull-type operation and push-type operation depend on the systemunder consideration. Here one can make the following distinctions:

The total motor vehicle system: By pull-type operation is understood the acceleration of the motor vehicle (time derivative of the driving speed) dv(t)/dt>0, while push-type operation corresponds to the deceleration of the motor vehicle, dv(t)/dt<0.

Clutch/transmission system: In pull-type operation, the input rpm of the clutch system (torque converter)/transmission is greater than its output rpm; by contrast, in push-type operation, the input rpm is less than the output rpm.

The internal combustion engine system: Pull-type operation implies a throttle valve position alpha(t)>0 and a time derivative of the engine rpm dnmot(t)/dt>0; by contrast, in push-type operation, the throttle valve position alpha(t)=0 or the time derivative of the engine rpm dnmot(t)/dt<0.

Figure 3:
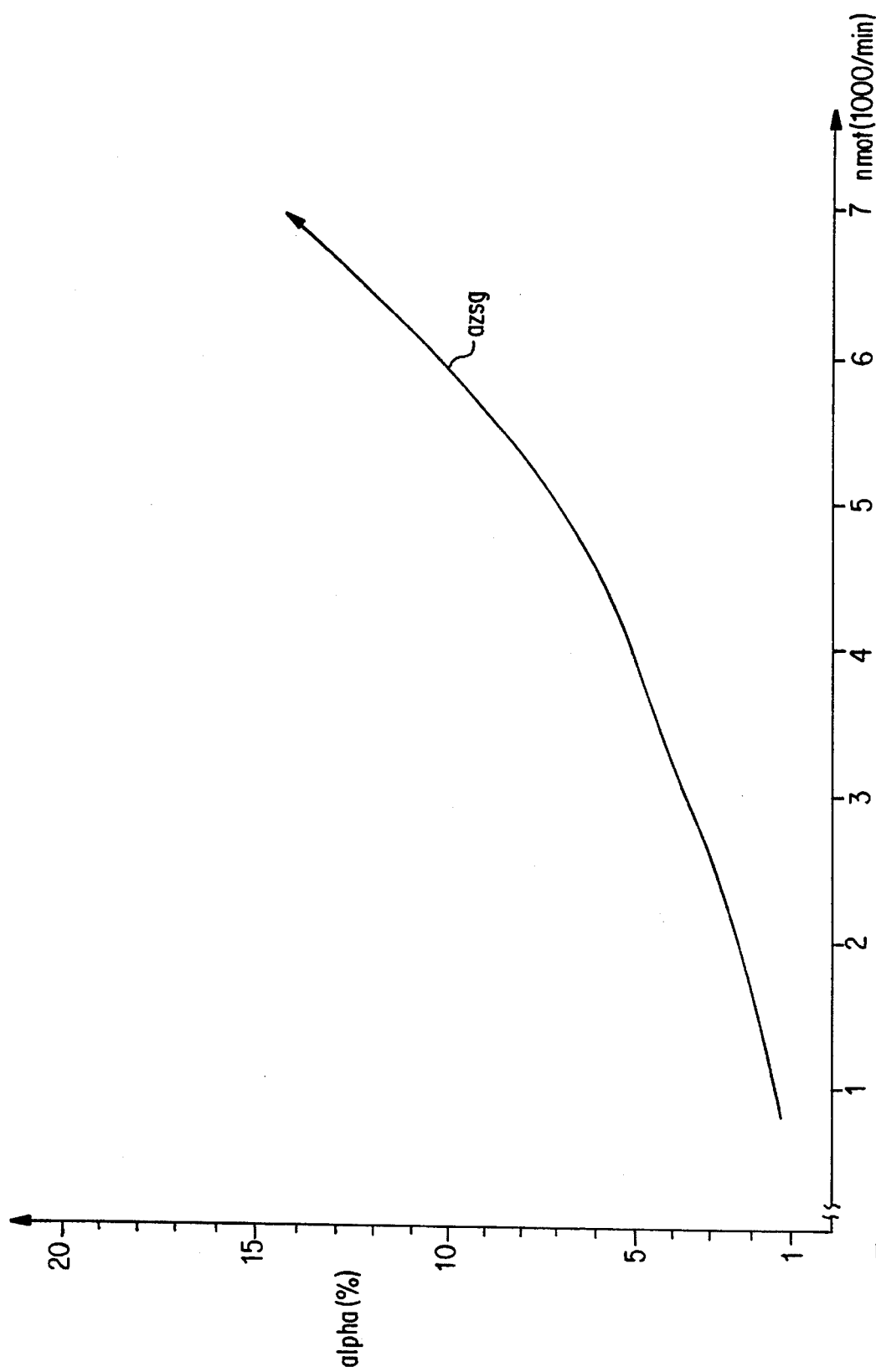
FIG. 3 shows a limiting curve to detect pull-type/push-type operation.

As regards the transmission control and thus also as regards the overall behavior of the motor vehicle, it has proven sensible to simulate the terms pull-type operation and push-type operation as follows:

Push-type operation is recognized when the throttle valve position alpha(t) falls below a limit curve azsg(nmot), which depends on the engine rpm, as shown in FIG. 3: alpha(t)<azsg(nmot).

Pull-type operation is recognized when the throttle valve position alpha(t) exceeds the engine-rpm-dependent limit curve azsg(nmot) according to FIG. 3, and at the same time the time derivative of the driving speed dv(t)/dt assumes positive values: alpha(t)>azsg(nmot) and dv(t)/dt>0.

The entire patent application makes reference to the terms pull-type and push-type operation defined in this way.

According to the invention, the transmission-ratio retention mechanism usf persists in the active state, usf=1, if push-type operation is again recognized during the passage of the first time interval TI(SK(t)); the transmission-ratio retention mechanism usf=1 here remains active until pull-type operation is recognized again and a second time interval T2(SK(t)) has elapsed.

In another development of the invention, the reduction of the transmission ratio ue of a continuously variable transmission, which was initiated upon expiration of the first or second time interval TI(SK(t)), T2(SK(t)), takes place with a third, definite finite, and relatively slow speed (time derivative of the transmission ratio ck3=due/dt=f(SK(t)). Here, the transmission ratio ue is changed to the value that is necessary to reach the theoretical motor rpm nmots(t), that is provided for at the instantaneous operating point in the instantaneously adjusted characteristic curve RKLj.

The magnitude of the first speed ck1 preferably is less than the magnitude of the third speed ck3: |ck1|<|ck3|; again, the latter should be less here than the maximum rate of change of the transmission ratio.

According to the third variant of the control process, a reduction of the engine rpm nmot(t), which was initiated upon expiration of the first or second time interval T1(SK(t)), T2(SK(t)), takes place at a fourth definite, finite, and relatively slow speed (time derivative of the engine rpm nk4=dnmot/dt=f(SK(t))) up to that value of the engine rpm nmot, which is provided for at the instantaneous operating point in the instantaneously adjusted characteristic control curve RKLj.

The magnitude of the second speed nk2 preferably is less than the magnitude of the fourth speed nk4: |nk2|<|nk4|.

Figure 8:
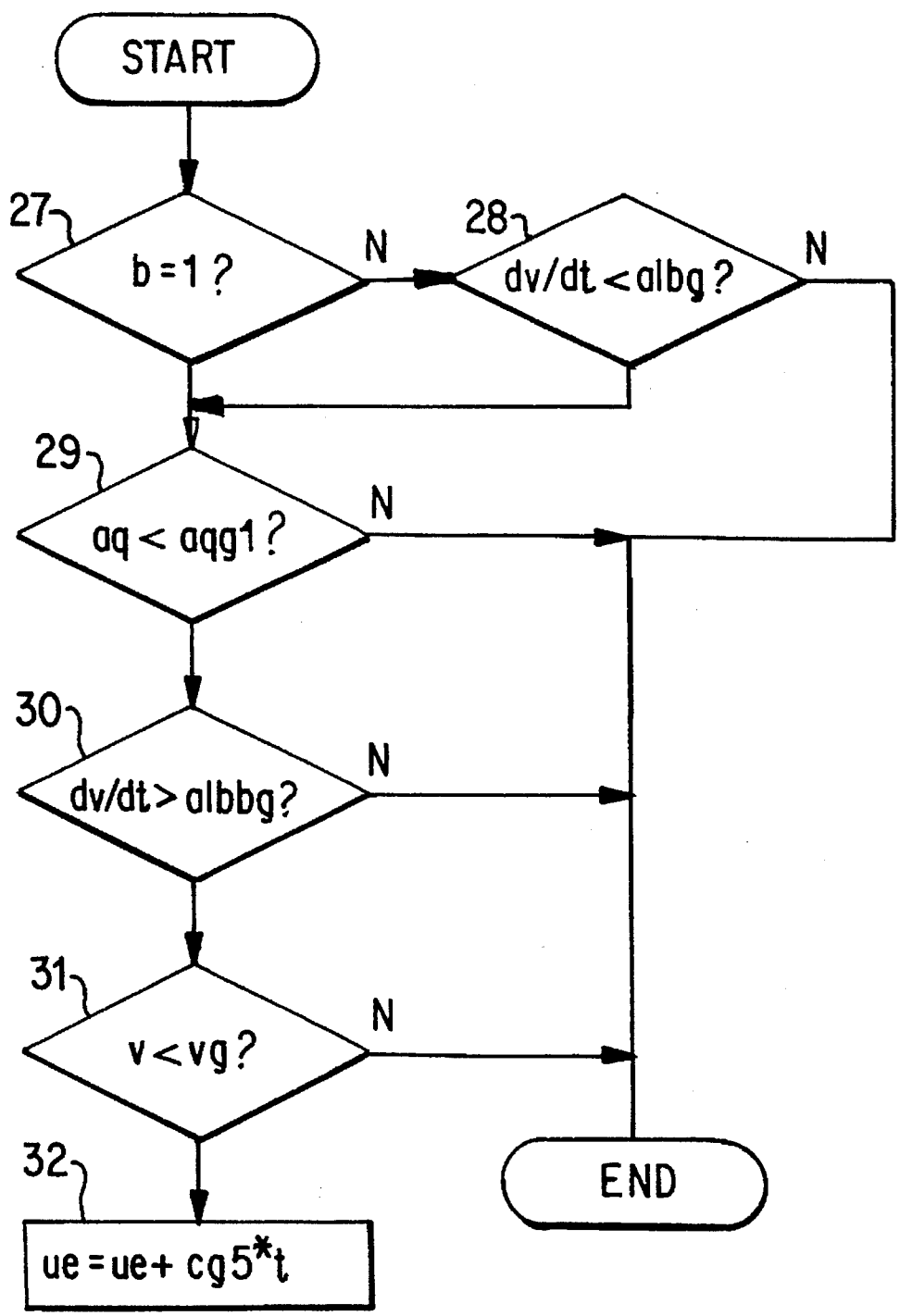
FIG. 8 is a flow chart illustrating an embodiment of the method according to the present invention.

Referring to the flow chart of FIG. 8, according to the invention—preferably with an active transmission-ratio retention mechanism usf=1—the transmission ratio ue increases with a fifth definite, finite speed (step 32) (time derivative of the transmission ratio cg5=due/dt=f(SK(t)) up to that value of the transmission ratio ue, which is necessary in order to reach an engine rpm nmot, which is the maximum one possible at the instantaneous operating point in the instantaneously adjusted characteristic control curve SK(t) (without the internal combustion engine assuming impermissible rpms and thus possibly suffering damage).

The following conditions are necessary for this:

A service brake of the motor vehicle must be activated: Brake signal b=1, (step 27) or as an alternative or supplement, the time derivative of the driving speed dv(t)/dt must be less than a first negative limit value for the longitudinal acceleration albg(ue, nmot, t), with albg(ue, nmot, t)<0: dv(t)/dt<albg(ue, nmot, t) (step 28), and also a transverse acceleration aq(t), sensed by means of the transverse acceleration sensor 17, must be less than a first transverse-acceleration limit curve aqgl(v(t)), which is a function of the driving speed: aq(t)<aqgl(v(t)) (step 29), and also the time derivative of the driving speed dv(t)/dt must be less than a second negative longitudinal-acceleration limit value albbg(nmot, ue, SK(t), t)=k(ue, SK(t))*albg(ue, nmot, t): dv(t)/dt>albbg(nmot, ue, SK(t), t)=k(ue, SK(t))*albg(ue, nmot, t) (step 30) and also the driving speed v(t) must be less than a driving-speed limit value vg(ue, SK(t)): v(t)<vg(ue, SK(t)) (step 31).

The transmission ratio is increased up to that value, which is permissible at the instantaneous operating point of the motor vehicle in the instantaneously adjusted characteristic control curve SK(t).

Figure 4:
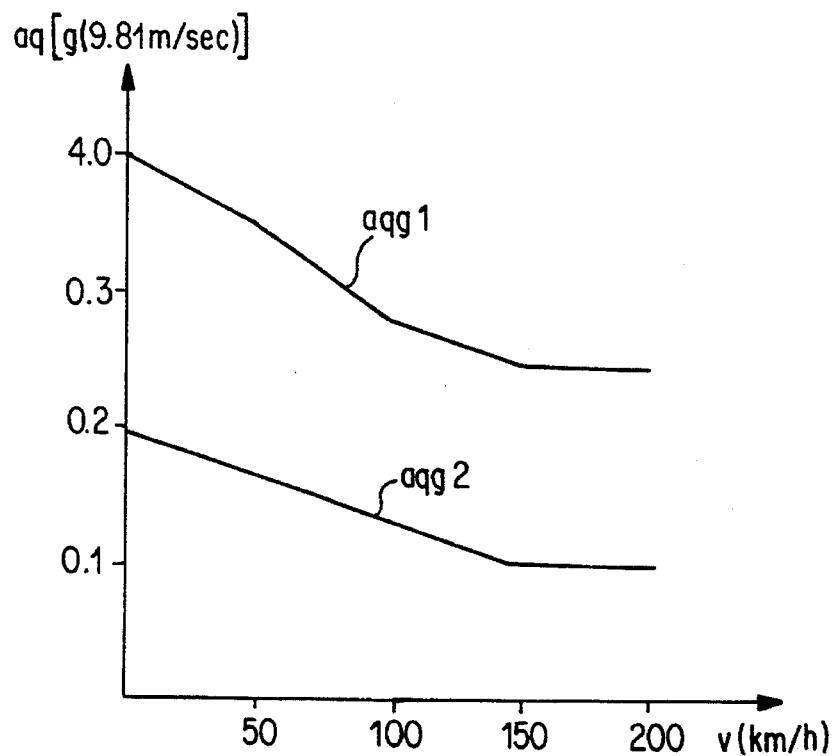
FIG. 4 shows a first and second limit curve for transverse acceleration, as a function of the driving speed.
Figure 7:
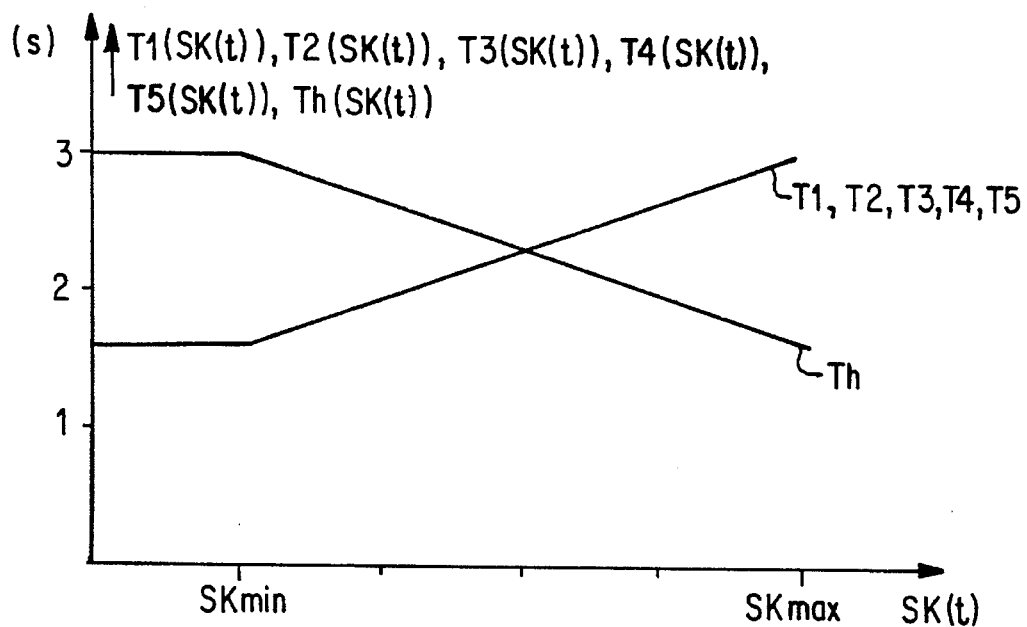
FIG. 7 shows a characteristic curve, which plots the dependence of time intervals on a driving activity.

The transverse acceleration limit curve aqgl(v(t)) here preferably depends on the driving speed. An appropriate curve is shown in FIG. 4. It takes into account that the transmission ratio ue is increased only if the transverse acceleration of the motor vehicle is not too high.

The first negative longitudinal-acceleration limit value albg(ue, nmot, t) depends on the instantaneous values of the transmission ratio ue and of the engine rpm nmot(t). It thus corresponds to the respective (negative) longitudinal acceleration dv/dt (and thus to the deceleration) of the motor vehicle rolling on a flat roadway in a defined state (load, tire air pressure, ambient conditions, etc.), with a closed throttle valve alpha=0, with the respective pairs of values of the instantaneously adjusted transmission ratio ue and of the engine rpm nmot(t).

Figure 5:
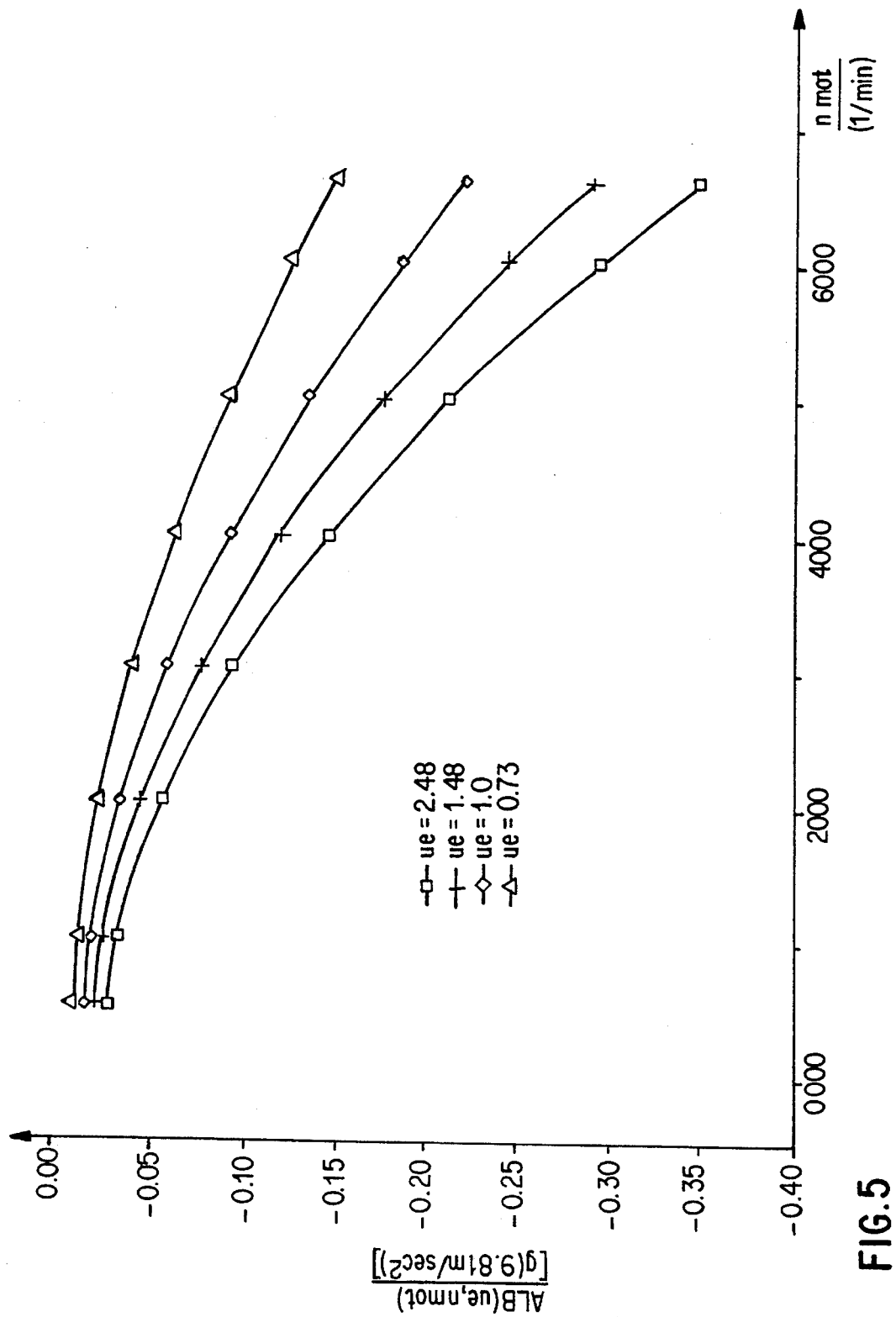
FIG. 5 shows a characteristic diagram for a characteristic diagram parameter, which depends on the engine rpm and on the transmission ratio.

The first negative longitudinal-acceleration limit value albg(us, nmot, t) is determined from the instantaneous values of these variables, preferably through a first characteristic diagram ALB(ue, nmot): albg(ue, nmot, t)=ALB(ue, nmot). FIG. 5 shows an example of such a first characteristic diagram ALB (ue, nmot). By way of example, four curves, depending on the transmission ratio, are shown here, which assign certain characteristic diagram values ALB(ue, nmot) in units of g, corresponding to 9.81... meters per second$^2$ (acceleration due to gravity), to specific values of the engine rpm nmot (in revolutions per minute).

The values 2.48–1.48–1.0–0.73 are plotted as the transmission ratios. To determine the characteristic diagram values of the—vehicle-specific—characteristic diagram, which differ from the shown (transmission ratio) curves, it is possible to interpolate or extrapolate in well-known fashion, depending on the transmission ratio. As an alternative to this, the longitudinal-acceleration limit values albg(g, nmot, t) naturally can also be determined through an appropriate functional connection.

The curves of FIG. 5 clearly show the dependence of the deceleration values of a motor vehicle with an internal combustion engine on the transmission ratio ue and on the engine rpm nmot(t). For increasing values of the engine rpm nmot(t), the deceleration values become larger as a result of the increasing engine braking effect and the increasing rolling resistance (air resistance) of the vehicle. The deceleration values also rise with an increasing transmission ratio ue, since the braking torque of the internal combustion engine affects the deceleration rate of the motor vehicle more strongly due to the higher transmission ratio.

The second negative longitudinal-acceleration limit value albbg(nmot, ue, SK(t))—k(ue, SK(t))*albg(ue, nmot, t) is determined from the product of a factor k(ue, SK(t)), which depends on the transmission ratio, and a value, determined under the instantaneous operating conditions of the motor vehicle, of the first negative longitudinal-acceleration limit value albg(ue, nmot, t).

Figure 6:
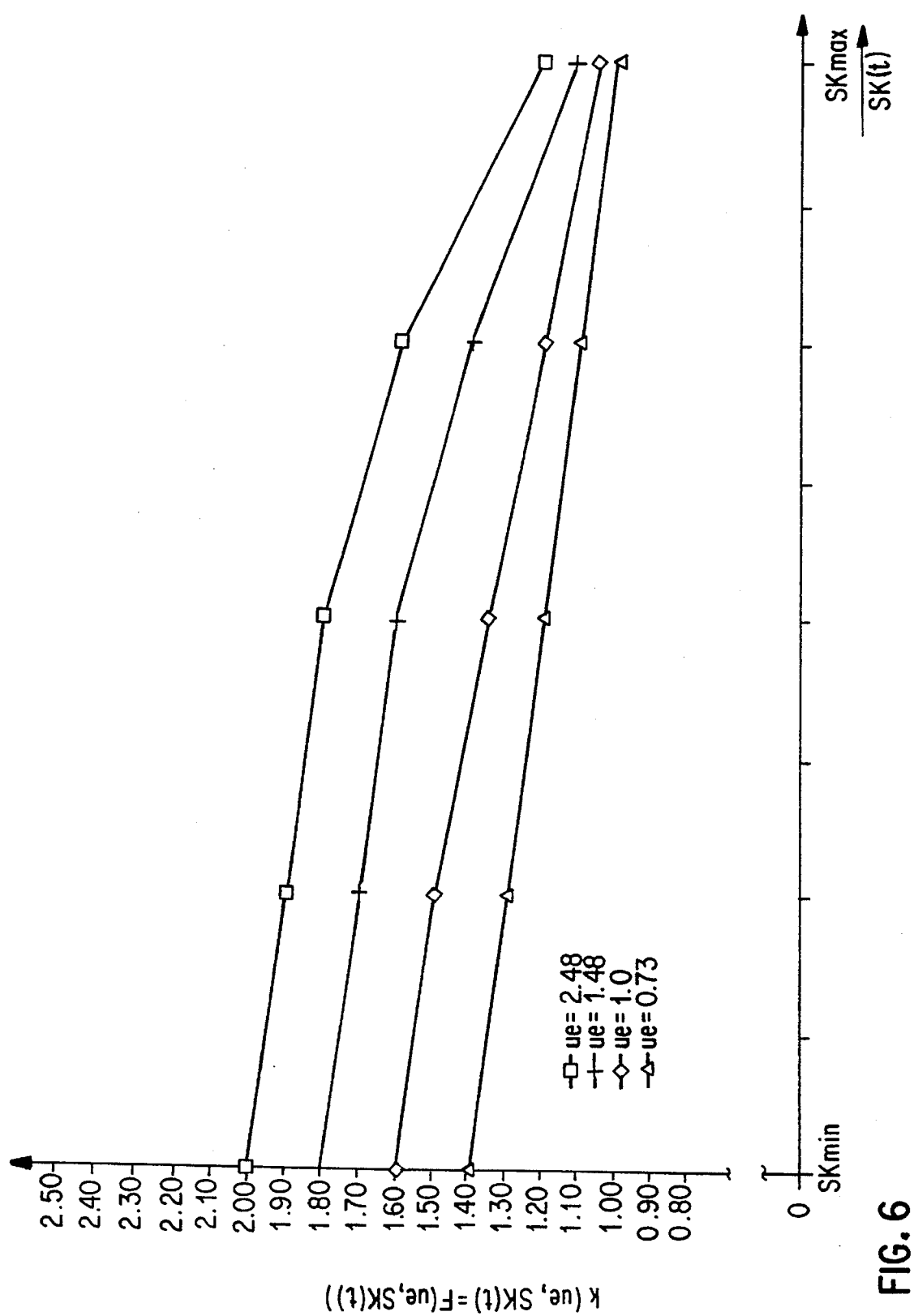
FIG. 6 shows a characteristic diagram for a factor, which depends on the transmission ratio and on the driver activity.

The factor k(ue, SK(t)), which depends on the transmission ratio, is determined through a second characteristic diagram k(ue, SK(t))=F(ue, SK(t)) from the instantaneous transmission ratio ue. An example of the second characteristic diagram is shown in FIG. 6. Here, again, the transmission-ratio-dependent curves (transmission ratios 2.48–1.48–1.0–0.73) assign dimensionless values of the factor (k(ue, SK(t)) to the values of the driving activity SK(t); the characteristic diagram values, which are valid for differing values of the transmission ratio ue can again be calculated from the existing values by interpolation or extrapolation.

The driving-speed limit value vg(ue, SK(t), t) depends on the transmission ratio ue and the driving activity SK(t).

The action of the individual process steps is explained as follows:

The wish of the driver to decelerate the vehicle more strongly or to shift down is sensed by monitoring the activation of the service brake of the motor vehicle (brake signal b=1) or, as an alternative or supplement thereto, by testing whether the time derivative of the driving speed $dv(t)/dt$ is less than the first negative longitudinal-acceleration limit value $albg(g, nmot)$, $dv(t)/dt<albg(g, nmot)$.

Whether or not the vehicle is already in a curve—a relatively tight one or one that can be run rapidly—is monitored by testing whether the transverse acceleration $aq(t)$ is less than the first specified transverse-acceleration limit line $aqgl(v(t))$. If the vehicle is already travelling on such a curve, downshifting is prevented, so that the frictional connection between the wheel and the roadway will not be lost as a result of the increased braking effect that would otherwise occur.

A comparable safety function is performed by monitoring whether the second negative longitudinal-acceleration limit value $albbg(nmot, g, SK(t))$ has been exceeded: Here it is determined whether the increased deceleration of the motor vehicle, which is expected as a result of the increased transmission ratio ue, would not cause the adhesive friction limit of the wheels to be exceeded.

For this purpose, an instantaneously maximum permissible deceleration is calculated from the deceleration expected under the instantaneous driving conditions by weighting (multiplying) with the factor $k(ue, SK(t))$, which depends on the transmission ratio, and this deceleration is compared with the instantaneous deceleration $dv(t)/dt$ of the motor vehicle; if the instantaneous deceleration is higher, the transmission ratio is not allowed to increase.

The factor $k(ue, SK(t))$, which depends on the transmission ratio, here takes into account that the second negative longitudinal-acceleration limit value $albbg(ue, nmot, t)$ is less than the first negative longitudinal-acceleration limit value $albg(ue, nmot, t)$, that is must have a greater magnitude (corresponding to a higher deceleration rate).

By monitoring whether the driving-speed limit value $vg(ue, SK(t), t)$, which depends on the transmission ratio, has been exceeded, other safety criteria can be met. These can relate to an increase of the transmission ratio at excessive speeds or to preventing the rpm of the driving internal combustion engine from exceeding the given limits after an increase of the transmission ratio. These safety criteria are strongly vehicle-specific and consequently must be adapted individually to each vehicle, so that there is not point in presenting a characteristic diagram.

An unintended change of the transmission ratio ue while running a curve must also be prevented after the approach to a curve or during braking before a curve. For this purpose, the transverse acceleration of the vehicle is monitored. In a first alternative, the change of the transmission ratio ue is avoided or the time intervals $T1(SK(t))$ and $T2(SK(t))$ are set to zero if the magnitude of the transverse acceleration $|aq(t)|$ exceeds a second and lower transverse-acceleration limit curve $aqg2(v(t))$, which depends on the driving speed $v(t)$ and which is shown in FIG. 4, or as long as a third time interval $T3(SK(t))$, subsequent to the transverse acceleration falling below the second transverse-acceleration limit curve $aqg2(v(t))$, has not yet elapsed.

In a second alternative, the transmission ratio (ue) is changed at a sixth specific, finite, and relatively slow rate (sixth time derivative of the transmission ratio $ck6=due/dt=f(SK(t))$) to that value of the transmission ratio ue, which is necessary to reach the theoretical engine rpm nmots, which is provided for RKLj at the instantaneous operating point of the motor vehicle (alpha(t), v(t), nmot(t), t) in the instantaneously adjusted characteristic control curve, and this continues as long as the magnitude of the transverse acceleration $|aq(t)|$ exceeds the second transverse-acceleration limit curve $aqg2(v(t))$ according to FIG. 4, or as long a fourth time interval $T4(SK(t))$, subsequent to the transverse acceleration falling below the transverse-acceleration limit curve $aqg2(v(t))$, has not yet elapsed.

After the third time interval $T3(SK(t))$ or the fourth time interval $T4(SK(t))$, a reduction of the transmission ratio (ue) is initiated at a seventh specific, finite, and relatively slow rate (seventh time derivative of the transmission ratio $ck7=due/dt=f(SK(t))$), to that value of a transmission ratio ue, which is necessary to reach the theoretical engine rpm nmots(t), that is provided for at the instantaneous operating point in the instantaneously adjusted characteristic control curve RKLj.

The magnitude of the sixth speed (sixth time derivative of the transmission ratio $ck6=due/dr$), here is less than the magnitude of the seventh speed (seventh time derivative of the transmission ratio $ck7=due/clt$): $|ck6|<|ck7|$.

Preferably, the magnitude $|ck7|$ of the seventh speed (seventh time derivative of the transmission ration $ck7$) is here less than the maximum possible rate of change of the transmission ratio.

The control corresponding to the second alternative reduces the transmission ratio during the curve relatively slowly, so that the engine rpm remains relatively constant and thus within the range desired by the driver (for example, in the range of highest torque). If, after the curve has been passed, there is no transition to pull-type operation, or if the time interval $T4(SK(t))$ elapses, the engine rpm $nmot(t)$ is brought relatively quickly to the actual theoretical engine rpm nmots(t) from the characteristic control curve RKLj, by suitably changing the transmission ratio ue.

In a third alternative, the transmission ratio ue continues to be adjusted as long as the magnitude $|aq(t)|$ of the transverse acceleration $aq(t)$ exceeds the second transverse-acceleration limit curve $aqg2(v(t))$ according to FIG. 4, or as long as the fourth time interval, subsequent to the transverse acceleration falling below the second transverse acceleration limit curve $aqg2(v(t))$, has not yet elapsed. This is done in such a fashion that the engine rpm $nmot(t)$ is kept constant or decreases at an eighth specific rate $nk8(SK(t))$ (eighth time derivative $nk8=tinmot/dr=f(SK(t))$ of the engine rpm $nmot(t)$).

The transmission ratio ue is kept constant during or after a curve, as soon as the engine rpm $nmot(t)$ has reached the value of the theoretical engine rpm, which is provided for at the instantaneous operating point of the motor vehicle in the instantaneously adjusted characteristic control curve RKLj.

Furthermore, the change of the transmission ratio ue is avoided and/or the time intervals $T1(SK(t))$, $T2(SK(t))$, $T3(SK(t), T4(SK(t))$ are set to zero, if the magnitude of the transverse acceleration $|aq(t)|$ exceeds a first transverse-acceleration limit curve $aqg1=f(v(t))$, which depends on the driving speed $v(t)$, or as long as a fifth time interval $T5(SK(t))$, subsequent to the transverse acceleration falling below the first transverse-acceleration limit curve $aqgl(v(t))$, has not yet elapsed. In this way, changes of the transmission ratio in extreme curves can be avoided.

However, a change of the transmission ratio ue, but especially an increase of the transmission ratio, is avoided and/or the time intervals $T1(SK(t))$, $T2(SK(t))$, $T3(SK(t))$, T4(SK(t)), and T5(SK(t)) are set to zero, if excessive slippage occurs at least at one wheel of the motor vehicle or if the friction connection between at least one wheel of the motor vehicle and the roadway is interrupted.

In this way, a change of transmission ratio, but especially an increase thereof, is permitted only if a difference speed Dv(t)=vref(t)-v(t) between a speed vref(t) of a non-driven axle and the driving speed v(t) sensed at a driven axle does not exceed a permissible value Dvzul(SK(t)) of the difference speed: Dv(t)<Dvzul(SK(t)).

Also, to reduce excessive wheel slippage associated with a transgression of the permissible value Dvzul(SK(t)) of the difference speed, the following steps can be taken:

A converter bypass coupling of a transmission equipped with a torque converter can be opened.

A holding time Th(SK(t)) is set, during which an increase of the transmission ratio ue cannot be prevented.

The set transmission ratio ue is reduced at least down to a permissible value.

An increase of the transmission ratio ue is prevented.

These functions are again reset when pull-type operation is recognized and the time derivative of the vehicle speed dv(t)/dt is positive.

The time intervals T1(SK(t)), T2(SK(t)), T3(SK(t)), T4(SK(t)), T5(SK(t)) and Th(SK(t)) can be either the same or different. At least one of the time intervals T1(SK(t)), T2(SK(t)), T3(SK(t)), T4(SK(t)), T5(SK(t)), Th(SK(t)), or at least the driving-speed limit value vg(ue, Sk(t), t), or the factor k(ue, SK(t)), which depends on the transmission ratio, or at least the first, second, third, fourth, fifth, sixth, seventh, or eighth speed ck1, nk2, ck3, nk4, cg5, ck6, ck7, nk8 for increasing or reducing the transmission ratio ue(t) of the engine nmot(t), or the permissible value Dvzul(SK(t)) of the difference speed advantageously are arbitrarily adjustable or advantageously are adjusted together with an adjustment of the characteristic control curves RKLj (consumption-optimized driving program, characteristic control curve RKL1; performance-optimized driving program, characteristic control curve RKL5), in such a fashion that, in the case of more performance-optimized driving programs (characteristic control curve RKL5), the time intervals Ti(SK(t)), T2(SK(t)), T3(SK(t)), T4(SK(t)), T5(SK(t)), the fifth speed cg5, and the limit value vg(g, SK(t), t) become greater, and the holding time Th(SK(t)), the speeds ck1, nk2, ck3, nk4, ck6, ck7, and nk8, the factor k(g−1, SK(t)), which depends on the shift gear, and the permissible value Dvzul(SK(t)) of the difference speed all become smaller.

However, if the transmission control provides for automatic adaptation of the characteristic control curves (RKLj) in correspondence with the driving activity (SK(t)), which evaluates over the long term the driving style of the driver or his action in response to the traffic situation as regards control of the motor vehicle, then at least one of the time intervals T1(SK(t)), T2(SK(t)), T3(SK(t)), T4(SK(t)), T5(SK(t)), Th(SK(t)), or at least the limit value vg(ue, SK(t), t) of the driving speed, or the factor k(ue, SK(t)), which depends on the transmission ratio, or at least the first, second, third, fourth, fifth, sixth, seventh, or eighth speed ck1, nk2, ck3, nk4, cg5, ck6, ck7, nk8 at which the transmission ratio ue(t) or the engine rpm nmot(t) is decreased or increased, or the permissible value Dvzul(SK(t)) of the difference speed preferably depend on the driving activity SK(t). With an increasing, more performance-oriented driving activity SK(t), the time intervals T1(SK(t)), T2(SK(t)), T3(SK(t)), T4(SK(t)), T5(SK(t)), the fifth speed cg5, and the limit value vg(g. SK(t), t) become greater and the holding time Th(SK(t)), the speeds ck1, nk2, ck3, nk4, ck6, ck7, and nk8, the shift-gear-dependent factor k(g−1, SK(t)), and the permissible value Dvzul(SK(t)) of the difference speed become smaller.

What is claimed is:

1. A method for controlling a continuously variable transmission (2), which is activated electro-hydraulically, of a motor vehicle driven with an internal combustion engine (4), which can be controlled by a power-control element, including one of a gas pedal and a throttle valve, such that the transmission ratio (ue) of the transmission (2) is automatically adjusted through the intermediacy of at least one characteristic control curve (RKL$_j$) in dependence on the position of the power control element (alpha(t)) and the engine rpm (nmot(t)), the method comprising the step of:

controlling the continuously variable transmission by increasing the transmission ratio (ue) at a fifth specific, finite, and slow rate (fifth time derivative of the transmission ratio cg5=due/dt=f(SK(t)), if a) at least one of 1) a service brake of the motor vehicle is activated and 2) the time derivative of the driving speed (dv(t)/dt) is less than a first negative longitudinal-acceleration limit value (albg(ue, nmot, t), albg(ue, nmot, t)<0 (dv(t)/dt<albg (ue, nmot, t)); and b) a transverse acceleration (aq(t)), sensed by means of a transverse-acceleration sensor (16), falls below a first specific transverse-acceleration limit curve (aqgl (v(t))) (aq(t)<aqgl (v(t))); and c) the time derivative of the driving speed (dv(t)/dt) is greater than a second negative longitudinal-acceleration limit value (albbg (nmot, ue, SK(t), t)=k(ue, SK(t)) * albg (ue, nmot, t)<0, (dr (t)/dt>dt albbg (nmott, ue, SK(t)=k(ue, SK(t)) * albg (ue, nmot, t)); and d) the driving speed (v(t)) is less than a driving-speed limit value (vg (ue, SK(t))), (v(t)<vg (ue, SK(t))).

2. The method of claim 1, wherein the transmission ratio increases only if a time derivative (dalpha(t)/dt) of the position of the power control element (alpha/t)) falls below a negative limit value (-alphag) and push-type operation is recognized, and as long as, after pull-type operation is recognized, a first time interval (T1(SK(t))) has not yet expired.

3. The method of claim 2, wherein push-type operation is recognized when the position of the power control element of the power control element (alpha(t)) falls below a characteristic limit curve (azsg(nmot)), which depends on the engine rpm (alpha(t))<azsg(nmot)).

4. The method of claim 3, wherein pull-type operation is recognized when the position of the power control element of the power control element (alpha(t)) exceeds the characteristic limit curve azsg(nmot), which depends on the engine rpm (alpha(t)>azsg(nmot)), and the time derivative of the driving speed (dv(t)/dt) also assumes positive values (alpha(t)>azsg (nmot) and dv(t)/dt>0).

5. The method of claim 4, wherein the transmission ratio (ue(t)) is increased up to that value of the transmission ratio (ue), which is permissible at an instantaneous operating point (alpha(t), v(t), nmot(t), t) in an instantaneously adjusted characteristic control curve.

6. The method of claim 5, wherein the first transverse-acceleration limit curve (aqgl(v(t))) depends on the driving speed (v(t)) of the motor vehicle.

7. The method of claim 6, wherein the first negative longitudinal-acceleration limit value (albg(ue, nmot, t)) depends on instantaneous values of the set transmission ratio (ue) and of the engine rpm (nmot(t)), and corresponds to the longitudinal acceleration (dv/dt: deceleration) of the motor vehicle rolling on a flat roadway in a defined state with its power control element closed (alpha=0), and corresponds with the values of an instantaneously adjusted transmission ratio (ue) and engine rpm (nmot).

8. The method of claim 7, wherein the first negative longitudinal-acceleration limit value (albg(ue, nmot, t)) is determined through a first characteristic diagram (ALB(ue, nmot)) from the instantaneous values of the transmission ratio (ue(t)) and the engine rpm (nmot(t)) (albg(ue, nmot, t)=ALB(ue, nmot)).

9. The method of claim 8, wherein the second negative longitudinal-acceleration limit value (albbg(nmot, ue, SK(t), t)=k(ue, SK(t)) * albg(ue, nmot, t)) is determined as the product of a factor (k(ue, SK(t)), which depends on the transmission ratio, and the instantaneous value of the first negative longitudinal-acceleration limit value (albg(ue, nmot, t)).

10. The method of claim 9, wherein the factor (k(ue, SK(t))), which depends on the transmission ratio, is determined from the instantaneous transmission ratio (ue) by way of a second characteristic diagram (k(ue, SK(t))=F(ue, SK(t))).

11. The method of claim 10, wherein the driving-speed limit value (vg(ue, Sk(t), t)) depends at least on the instantaneous values of the set transmission ratio (ue).

12. The method of claim 11, wherein the transmission ratio (ue) is retained at least as long as the magnitude of the transverse acceleration (|aq(t)|) exceeds a second transverse-acceleration limit curve (aqg2(v(t))), or as long as a third time interval (T3(SK(t))) has not yet elapsed subsequent to the transverse acceleration falling below the second transverse-acceleration limit curve (aqg2(v(t))).

13. The method of claim 11, wherein the transmission ratio (ue) is changed at a sixth, specific, finite, and slow rate (sixth time derivative of the transmission ratio ck6=due/dt= f(SK(t))), until that value of the transmission ratio (ue), which is necessary to reach a theoretical engine rpm (nmots(t)), which is called for at the instantaneous operating point of the motor vehicle (alpha(t), v(t), nmot(t), t) in the instantaneously adjusted characteristic control curve (RKLj), as one of long as the magnitude of the transverse acceleration (|aq(t)|) exceeds the second transverse-acceleration limit curve (aqg2(v(t))), and a fourth time interval (T4(SK(t))) has not yet elapsed subsequent to the transverse acceleration falling below the second transverse-acceleration limit curve (aqg2(v(t))).

14. The method of claim 13, wherein the transmission ratio (ue), which began to be reduced after expiration of one of the third time interval (T3(SK(t))) and the fourth time interval (T4(SK(t))), is reduced at a seventh specific, finite, and relatively slow rate (seventh time derivative of the transmission ratio ck7=due/dt=f(SK(t))), down to that value of the transmission ratio (ue), which is necessary to reach the theoretical engine rpm (nmots(t)), which is called for at the instantaneous operating point in the instantaneously adjusted characteristic diagram for the transmission ratio.

15. The method of claim 14, wherein the magnitude of the sixth speed (time derivative of the transmission ratio ck6= due/dr) is less than the magnitude of the seventh speed (time derivative of the transmission ratio ck7=due/tit), (|ck6|<|ck7|).

16. The method of claim 15, wherein the magnitude of the seventh speed (|ck7|) (magnitude of the time derivative of the transmission ratio |ck7|=|due/dt|) is less than the maximum possible rate of change of the transmission ratio.

17. The method of claim 16, wherein, as long as one of 1) the magnitude (|aq(t)|) of the transverse acceleration (aq(t)) exceeds the second transverse-acceleration limit curve (aqg2(v(t))), and 2) the time is less than the fourth time interval, subsequent to the transverse acceleration falling below the second transverse-acceleration limit curve (aqg2(v(t))), the transmission ratio (ue) is adjusted such that the engine rpm (nmot(t)) is held constant, or that the engine rpm (nmot(t)) decreases at an eighth specific rate (nk8(SK(t))) (eighth time derivative (nk8=dnmot/dt= f(SK(t)) of the engine rpm nmot(t)).

18. The method of claim 17, wherein the transmission ratio (ue) is held constant as soon as the engine rpm (nmot(t)) has reached that value of the theoretical engine rpm (nmots(t)), that is called for at the instantaneous operating point of the motor vehicle in the instantaneously adjusted characteristic control curve (RKLj).

19. The method of claim 18, wherein at least one of a change of the transmission ratio (ue) is prevented and the time intervals (T1(SK(t)), T2(SK(t)), T3(SK(t)), T4(SK(t))) are set to zero, if one of 1) the magnitude of the transverse acceleration (|aq(t)|) exceeds the first transverse-acceleration limit curve (aqgl (v(t))), which depends on the driving speed (v(t)), and 2) a fifth time interval (T5(SK(t))) has not yet elapsed subsequent to the transverse acceleration falling below the first transverse-acceleration limit curve (aqgl(v(t))).

20. The method of claim 19, further comprising the steps of determining if a difference between sensed driving axle speed and sensed maxi-drives axle speed of the motor vehicle exceeds a limit value; there at least one of an increase of the transmission ratio is avoided and the time intervals (T1(SK(t)), T2(SK(t)), T3(SK(t)), T4(SK(t)), T2(SK(t))) are set to zero.

21. The method of claim 19, wherein an increase of the transmission ratio is permitted only if a difference speed (Dv(t)=vref(t)−v(t)) between a speed (vref(t)) of a non-driven axle and the driving speed (v(t)) sensed at a driven axle does not exceed a permissible difference speed (Dvzul(SK(t))), (Dv(t)<Dvzul(SK(t))).

22. The method of claim 21, further comprising the step of arbitrarily adjusting any one of: 1), at least one of the time intervals (T1(SK(t)), T2(SK(t)), T3(SK(t)), T4(SK(t)), T5(SK(t)), Th(SK(t))); 2) at least the driving-speed limit value (vg(ue, Sk(t), t); 3) the factor d(ue, SK(t))) which depends on the transmission ratio; 4) at least the first, second, third, fourth, fifth, sixth, seventh, or eighth speed (ck1, nk2, ck3, nk4, cgS, ck6, ck7, nk8) for changing at least one of the transmission ratio (ue(t)) and the engine rpm (nmot (t)); and 5) the permissible difference speed value (Dvzul (SK(t))) together with an adjustment of the characteristic control curves (RKLj) such that, in the case of more performance-optimized driving programs, the time intervals (T1(SK(t)), T2(SK(t)), T3(SK(t)), T4(SK(t)), T5(SK(t))), the fifth speed (cg5), and the limit value (vg(g, SK(t) t))) are increased, and the holding time (Th(SK(t))), the speeds (ck1, nk2, ck3, nk4, ck6, ck7, and nk8), a factor (k(g−1, SK(t))), which depends on the shift step, and the permissible difference speed (Dvzul (SK (t))) decrease.

23. The method of claim 22, further comprising the step of arbitrarily adjusting any one of: 1) at least one of the time intervals (T1(SK(t)), T2(SK(t)), T3(SK(t)), T4(SK(t)), T5(SK(t)), Th(SK(t))); 2) at least the driving-speed limit value (vg(ue, Sk(t), t); 3) the factor k (ue, SK (t))) which depends on the transmission ratio; 4) at least the first, second, third, fourth, fifth, sixth, seventh, or eighth speed (ck1, nk2, ck3, nk4, cgS, ck6, ck7, nk8) for changing at least one of the transmission ratio (ue(t)) and the engine rpm (nmot(t)); and 5) the permissible difference speed value (Dvzul (SK(t))) depending on a driving activity (Sk(t)), which evaluates over a period of time a driving style of the driver in regards to the control of the motor vehicle and, in the case of a performance-oriented driving activity (SK(t)), the time intervals (T1(SK(t)), T2(SK(t)), T3(SK(t)), T4(SK(t)), T5(SK(t))), the fifth speed (cg5), and the limit value (vg(g, SK(t), t))) increase and the holding time (Th(SK(t))), the speeds (ck1, nk2, ck3, nk4, ck6, ck7, and nk8), the factor k(g−1, SK(t))), which depends on the shift step, and the permissible difference speed (Dvzul (SK(t))) are decreased.

24. The method of claim 23, wherein the driving activity (SK(t)) is determined as a functional relationship, which evaluates over the period of time the driving style of the driver with respect to the control of the motor vehicle, said functional relationship being determined from current and past values of one of a single characteristic operating variable and of a single variable composed of several characteristic operating variables of the motor vehicle.

* * * * *